(12) United States Patent
Hu et al.

(10) Patent No.: US 10,660,160 B2
(45) Date of Patent: May 19, 2020

(54) NANO ALUMINA FABRIC PROTECTION PLY FOR DE-ICERS

(71) Applicant: Goodrich Corporation, Charlotte, NC (US)

(72) Inventors: Jin Hu, Hudson, OH (US); Galdemir Cezar Botura, Akron, OH (US)

(73) Assignee: Goodrich Corporation, Charlotte, NC (US)

( * ) Notice: Subject to any disclaimer, the term of this patent is extended or adjusted under 35 U.S.C. 154(b) by 545 days.

(21) Appl. No.: 15/271,009

(22) Filed: Sep. 20, 2016

(65) Prior Publication Data

US 2018/0084612 A1 Mar. 22, 2018

(51) Int. Cl.
*H05B 3/34* (2006.01)
*H05B 3/14* (2006.01)
*B64D 15/12* (2006.01)

(52) U.S. Cl.
CPC ............. *H05B 3/34* (2013.01); *B64D 15/12* (2013.01); *H05B 3/14* (2013.01); *H05B 2203/017* (2013.01); *H05B 2214/02* (2013.01); *H05B 2214/04* (2013.01)

(58) Field of Classification Search
CPC  H05B 3/145; H05B 2214/04; H05B 203/017; H05B 2203/011
USPC ........ 219/202, 203, 541, 553; 428/102, 220, 428/297.4
See application file for complete search history.

(56) References Cited

U.S. PATENT DOCUMENTS

| 6,237,874 | B1 * | 5/2001 | Rutherford | ............ B64D 15/14 244/134 D |
|---|---|---|---|---|
| 8,662,449 | B2 | 3/2014 | Shah et al. | |
| 8,664,573 | B2 | 3/2014 | Shah et al. | |
| 2003/0003287 | A1 * | 1/2003 | Tobita | ...................... C08J 5/046 428/297.4 |
| 2006/0035548 | A1 * | 2/2006 | Goto | ..................... B29B 15/122 442/65 |
| 2007/0207186 | A1 * | 9/2007 | Scanlon | .................... A61F 2/07 424/424 |
| 2007/0224451 | A1 * | 9/2007 | Chandran | ............... C04B 35/16 428/698 |
| 2010/0122980 | A1 | 5/2010 | Wang et al. | |
| 2011/0180524 | A1 * | 7/2011 | Brittingham | ............... C08J 3/18 219/202 |
| 2014/0014640 | A1 * | 1/2014 | Calder | ................... B64D 15/12 219/202 |
| 2015/0076137 | A1 * | 3/2015 | Kim | ........................ H05B 3/20 219/553 |

FOREIGN PATENT DOCUMENTS

| EP | 0680878 A1 | 11/1995 |
| EP | 2963995 A1 | 1/2016 |
| WO | WO2016144683 A1 | 9/2016 |

OTHER PUBLICATIONS

Extended European Search Report for EP Application No. 17192201. 6, dated Feb. 23, 2018, 9 Pages.

* cited by examiner

*Primary Examiner* — Thien S Tran
(74) *Attorney, Agent, or Firm* — Kinney & Lange, P.A.

(57) ABSTRACT

A nano alumina fabric protects heaters used for de-icing aircraft or other vehicles. This allows heaters to withstand mechanical foreign object damage (FOD), is environmentally safe, and is a cost-efficient alternative to other protection fabrics.

17 Claims, 7 Drawing Sheets

NANO ALUMINA FABRIC PROTECTION PLY FOR DE-ICERS

BACKGROUND

An aircraft moving through the air is often subjected to ice formation, and anti-icing or de-icing devices must be used to remove or prevent ice from accumulating on exterior surfaces of the aircraft. For any type of electrical heaters or de-icing heaters, the closer the heater is to the skin of an airfoil, nacelle, nosecone, engine cowl, or other aircraft part, the less power it takes to heat or de-ice the aircraft element due to the proximity of the heater to the external surface. Thus, aerospace applications of de-icing heaters attempt to place those heaters as close to the external surface, as possible. However, heaters used for de-icing on aircrafts are often subject to foreign object damage (FOD), such as hail, bird strikes, and other debris, particularly when those heaters are placed too close to the surface. Ideally, the heater uses minimal power to accomplish de-icing but is protected from FOD.

The materials used to protect heaters used for de-icing must be thermally conductive, allowing transfer of heat between the heater and the external surface of the aircraft element, but must also be electrically insulating to prevent shorting of the heater. Most thermally conductive materials are also electrically conductive, limiting the choice of materials.

SUMMARY

A heating assembly includes a nano alumina fabric; a first adhesive; a heating element, wherein the nano alumina fabric is attached to the heating element by the first adhesive; a second adhesive; and a glass pre-preg fabric, wherein the glass pre-preg fabric is attached to the heating element by the second adhesive on a side of the heating element opposite the nano alumina fabric.

A method for making a heating assembly includes obtaining a nano alumina fabric, wherein the nano alumina fabric comprises a glass fiber matrix and aluminum oxide fibers; bonding the nano alumina fabric to a heating element with a first adhesive; bonding the heating element to a glass pre-preg fabric with a second adhesive; and curing the assembly.

DETAILED DESCRIPTION

A de-icing heater can be protected by strong, thermally conductive but electrically insulating material such as nano aluminum oxide (nano alumina) fabric. Nano alumina fabric is strong enough to mitigate mechanical damage from bird strikes, hail, or other foreign object damage (FOD) when a heater is attached to an external surface of an aircraft. Additionally, nano alumina fabric is environmentally safe. Commonly, nano alumina is used to filter water, is digested naturally in the environment, and is nontoxic.

Figure 1A:
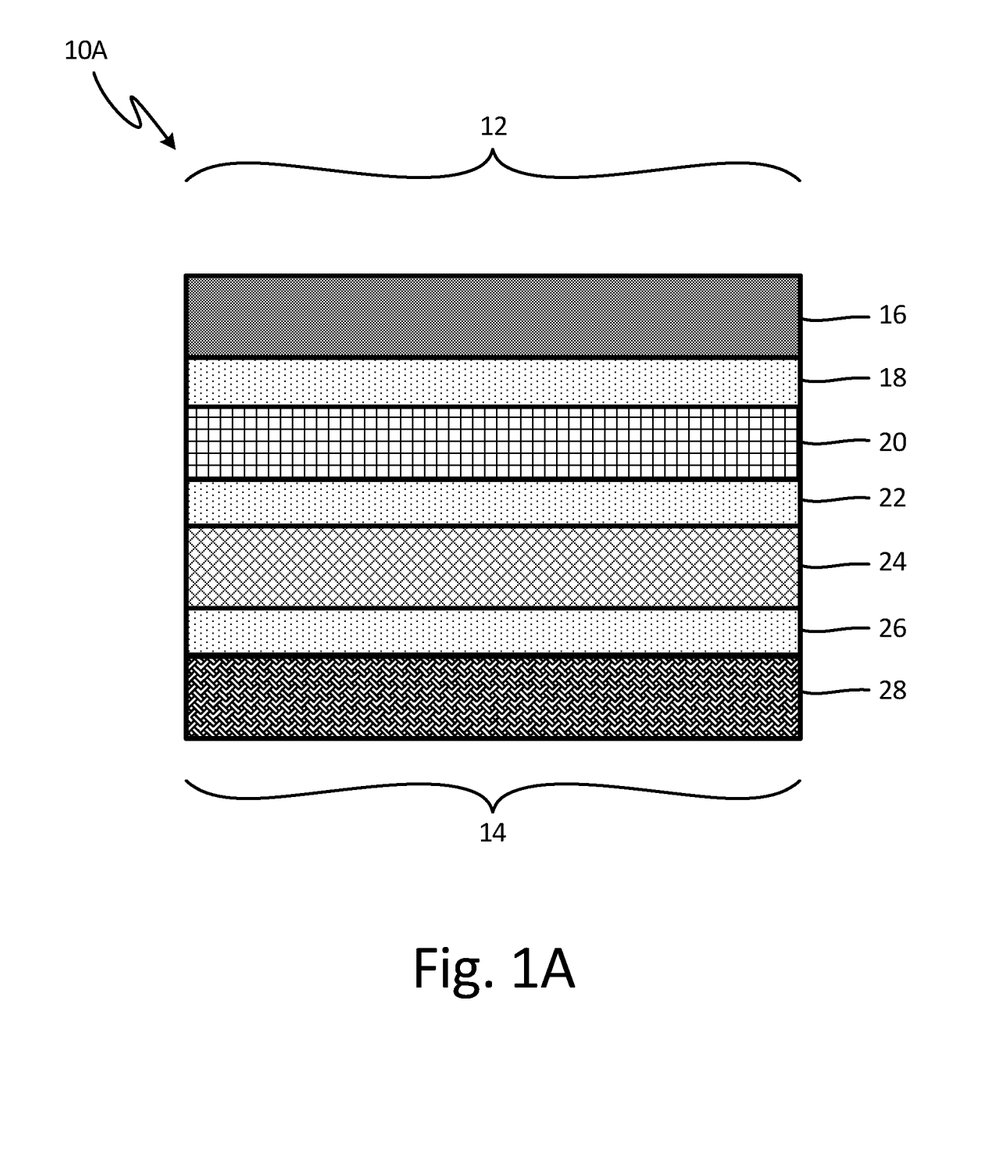
FIG. 1A is a schematic diagram of a thermally conductive, electrically insulated protected heater assembly.

FIGS. 1A-1E will be discussed together. FIG. 1A is schematic diagram of a thermally conductive, electrically insulated protected heater assembly 10A. Assembly 10A has breeze size 12 and bond side 14. Breeze side 12 faces an external environment and is subject to icing. Bond side 14 can be attached to part of an aircraft, such as an airfoil or other element. Assembly 10A includes metallic skin 16, first film adhesive 18, "fuzzy" nano alumina pre-preg fabric 20, second film adhesive 22, electric heater 24, third film adhesive 26, and glass pre-preg fabric 28. Metallic skin 16 is attached to nano alumina pre-preg fabric 20 by first film adhesive 18. Nano alumina pre-preg fabric 20 is attached to electric heater 24 through second film adhesive 22. Electric heater 24 is attached to glass pre-preg fabric 28 by third film adhesive 26. Glass pre-preg fabric 28 can be attached to an aircraft component (not pictured).

On breeze side 12 of heating assembly 10A is metallic skin layer 16, which is connected to nano alumina pre-preg fabric 20 by first film adhesive 18. First film adhesive 18 can be a commercially available adhesive which is thermally conductive. First film adhesive 18 can be the same or different from second and third adhesives 22, 26. Skin layer 16 is a metallic or alloy-based skin designed to prevent foreign object damage to electric heater 24. Because skin layer 16 is electrically conductive, it should not be directly adhered to electric heater 24. Instead, nano alumina pre-preg fabric 18 is sandwiched between skin layer 16 and electric heater 24.

Nano alumina pre-preg fabric 20 is referred to as "fuzzy" due to its structure. Nano alumina is aluminum oxide sized in nanometer dimensions. Nano alumina pre-preg fabric includes glass fibers which are mixed with aluminum oxide. The aluminum oxide fibers "grow" on the surfaces of glass fibers, appearing "fuzzy" in the completed fabric. In this embodiment, nano alumina pre-preg fabric is impregnated with a polymer resin, such as an epoxy, a phenolic polymer, or a bismaleimide polymer. The resulting fabric is then cured before it is used.

Nano alumina pre-preg fabric 20 is connected to electric heater 24 by second film adhesive 22. Second film adhesive 22 can be a commercially available adhesive. Second film adhesive 22 can be the same or different from first adhesive 18. Electric heater 24 can be a nano-carbon heater or a resistive heater. Resistive heaters are comprised of metals or metal alloys, and are more cost-efficient, but higher weight than carbon alternatives. Nano-carbon heaters can be made of carbon nanotubes (CNTs), graphene, or graphene nanoribbons (GNTs). Carbon allotrope heaters are uniquely beneficial for de-icing because of their high efficiency, light weight, low cost, ability to be molded into specific shapes, and durability.

CNTs are allotropes of carbon that have a generally cylindrical nanostructure, and have a variety of uses. CNTs are both thermally and electrically conductive. Due to these properties, CNTs can be used as heaters to prevent icing on aircrafts or other vehicles. Sheets of CNTs have been used as heaters because they are both lightweight and highly efficient. Graphene has a two-dimensional honeycomb lattice structure, and is much stronger than steel, but is still electrically and thermally conductive. GNRs are strips of graphene with ultra-thin widths.

Nano alumina pre-preg fabric 20 protects electric heater 24 from foreign object damage (FOD), hail, bird strikes, or other events that may damage electric heater 24. Nano alumina is thermally conducting, so heat from electric heater 24 can still efficiently pass through nano alumina pre-preg fabric 18 to an external surface of breeze side 12, but is electrically insulating, so electric heater 24 is not shorted. Nano alumina pre-preg fabric 20 helps to ensure electric heater 24 can still de-ice aircraft parts, but is more resistant against FOD. Nano alumina is particularly appealing for this application because it is a lower cost item that is readily available and is environmentally safe.

Electric heater 24 turns electric current received from a power source (not pictured) into heat, preventing ice formation on an aircraft element. While electric heater 24 is de-icing an aircraft element, nano alumina pre-preg fabric 20 protects electric heater 24 from FOD and electrically insulates electric heater 24. Additionally, nano alumina pre-preg fabric 20 is acoustically insulating. Thus, an aircraft element and electric heater 24 are protected from acoustic vibrations during operation of aircraft.

Glass pre-preg fabric 28 is attached to electric heater 24 by third film adhesive 26. Third film adhesive 26 is a commercially available adhesive, and can be the same or different from first and second adhesives 18 and 22. Glass pre-preg fabric 28 can be a commercially available glass pre-preg fabric. Glass pre-preg fabric 28 protects electric heater 24 on bond side 14 of heating assembly 10A. Glass pre-preg fabric 28 can be attached to an element of an aircraft (not pictured), such as an airfoil, nacelle, nosecone, engine cowl, or other aircraft part.

Figure 1B:
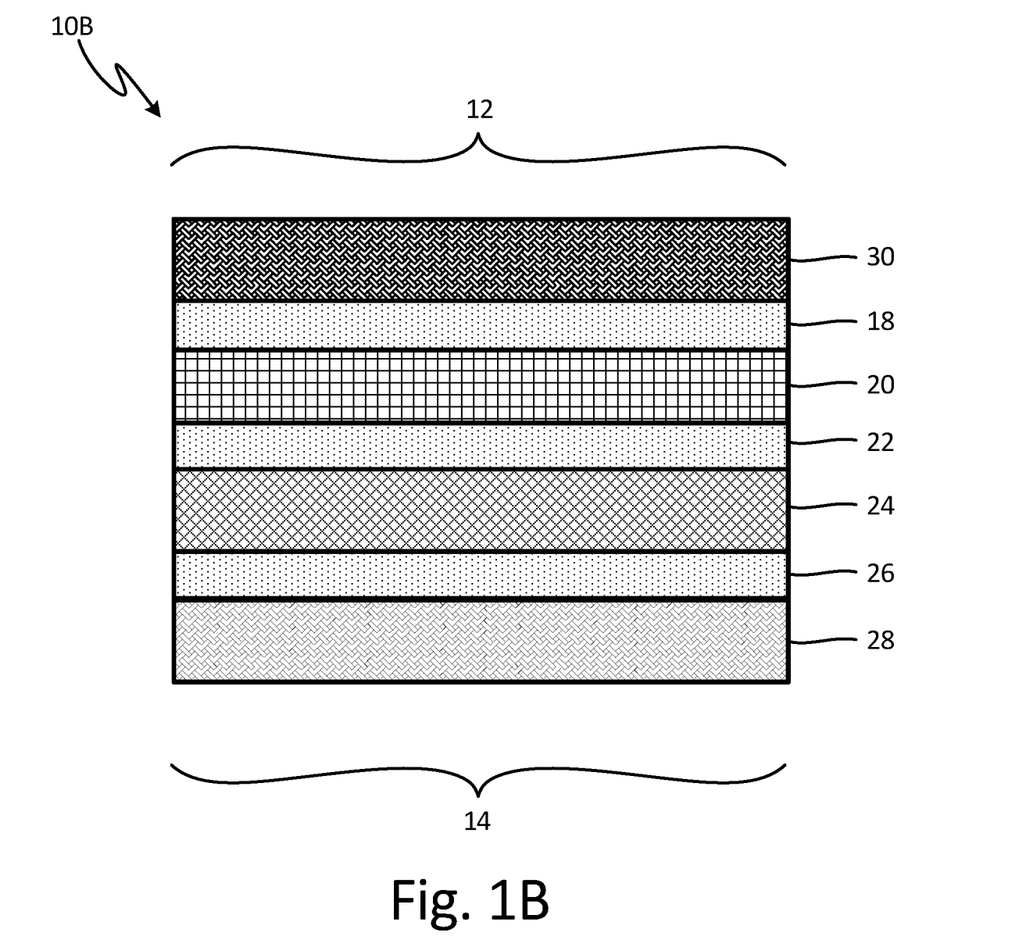
FIG. 1B is a schematic diagram of a thermally conductive, electrically insulated protected heater assembly in a different embodiment.
Figure 1C:
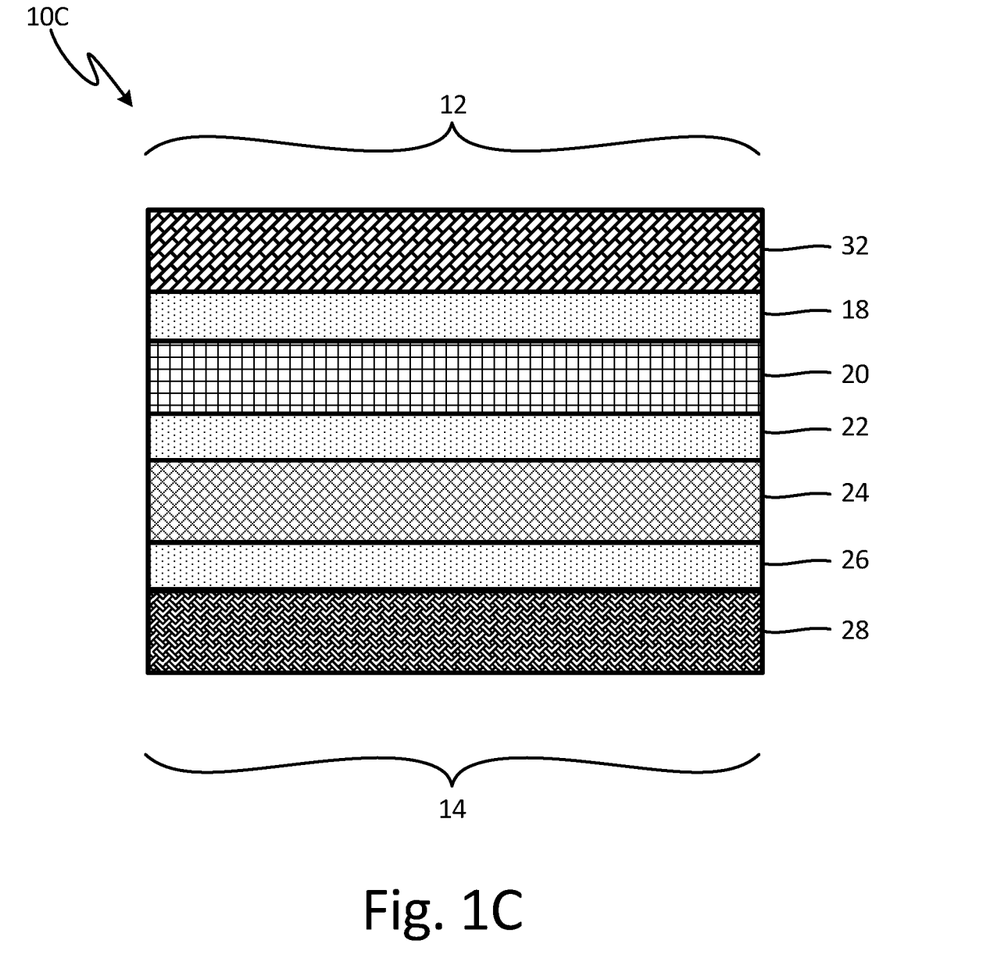
FIG. 1C is a schematic diagram of a thermally conductive, electrically insulated protected heater assembly in a different embodiment.
Figure 1D:
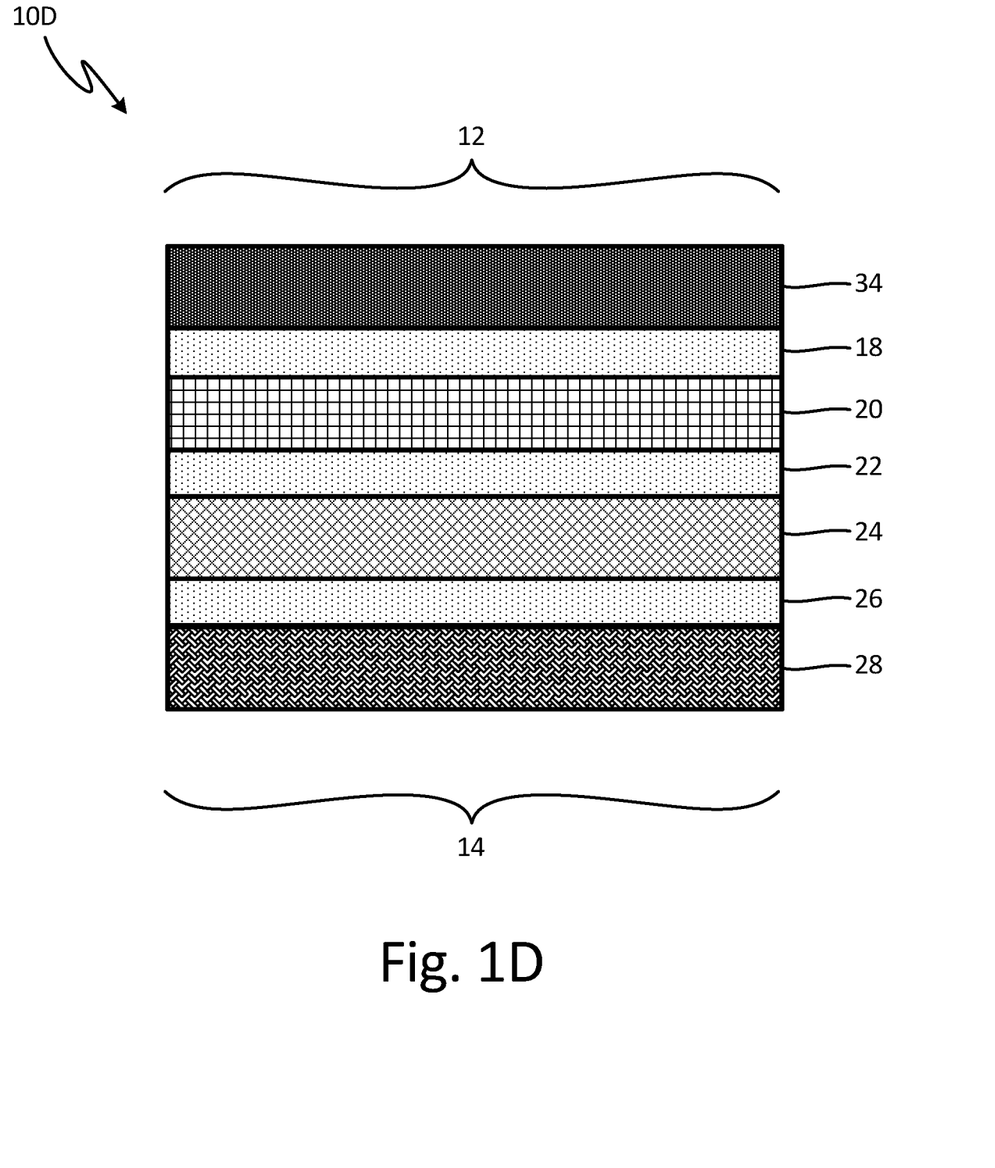
FIG. 1D is a schematic diagram of a thermally conductive, electrically insulated protected heater assembly in a different embodiment.

The embodiments shown in FIG. 1B-1E are variations on assembly 10A shown in FIG. 1A. All elements are the same except where otherwise noted. In FIG. 1B, metallic skin 16 is replaced with carbon fabric skin 30. Carbon pre-preg fabric skin 30 is lighter weight than metallic skin 16, and is durable. In FIG. 1C, carbon nanotube (CNT) pre-preg skin 32 replaces metallic skin 16. CNT pre-preg skin 32 is uniquely beneficial for de-icing because of its high efficiency, light weight, low cost, ability to be molded into specific shapes, and durability. In FIG. 1D, CNT filled film skin 34 is used instead of metallic skin 16. Each of the carbon-based skins in FIG. 1B-1D have unique properties and may be more useful in different parts of an aircraft, depending on the needs of that particular aircraft element.

Figure 1E:
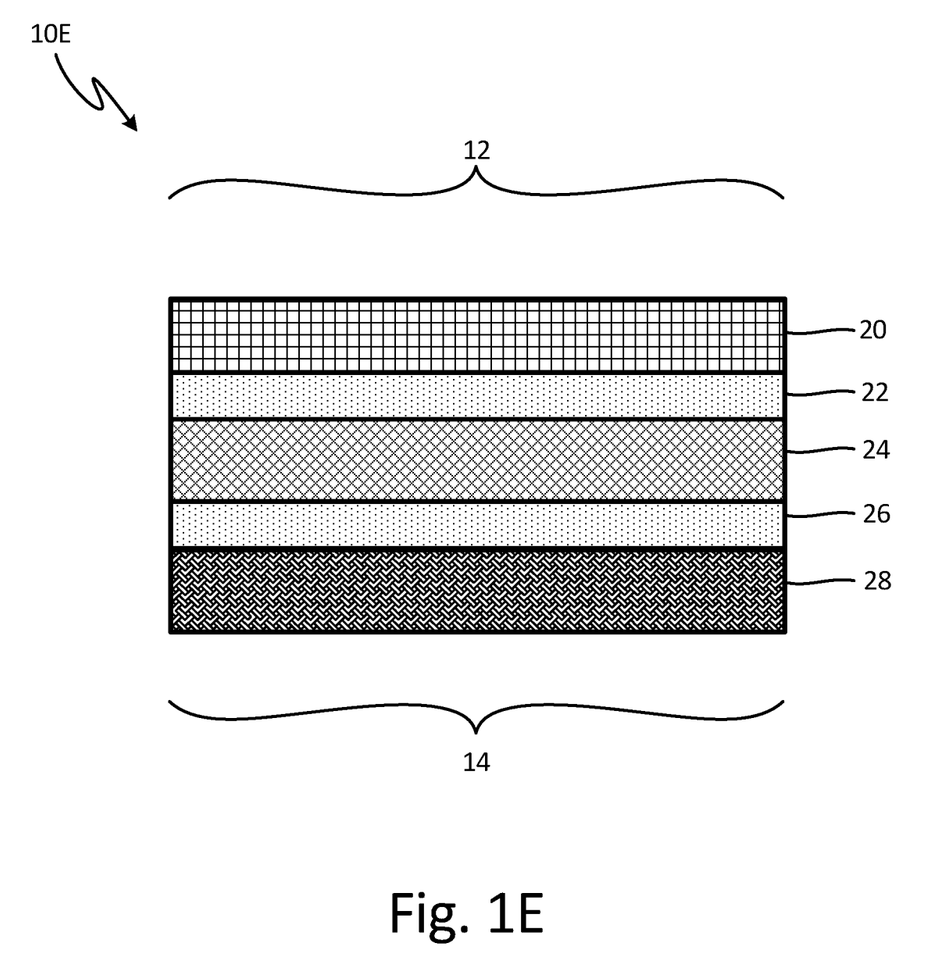
FIG. 1E is a schematic diagram of a thermally conductive, electrically insulated protected heater assembly in a different embodiment.

In FIG. 1E, there is no additional skin layer. Instead, nano alumina pre-preg fabric 20 serves as the outermost skin layer in heating assembly 10E. This arrangement still provides FOD protection to electric heater 24 because of nano alumina pre-preg fabric 20's strength and durability. But it also minimizes cost and weight by eliminating one layer of the heating assembly. This embodiment is useful in environments where a thicker skin is not needed.

Figure 2:
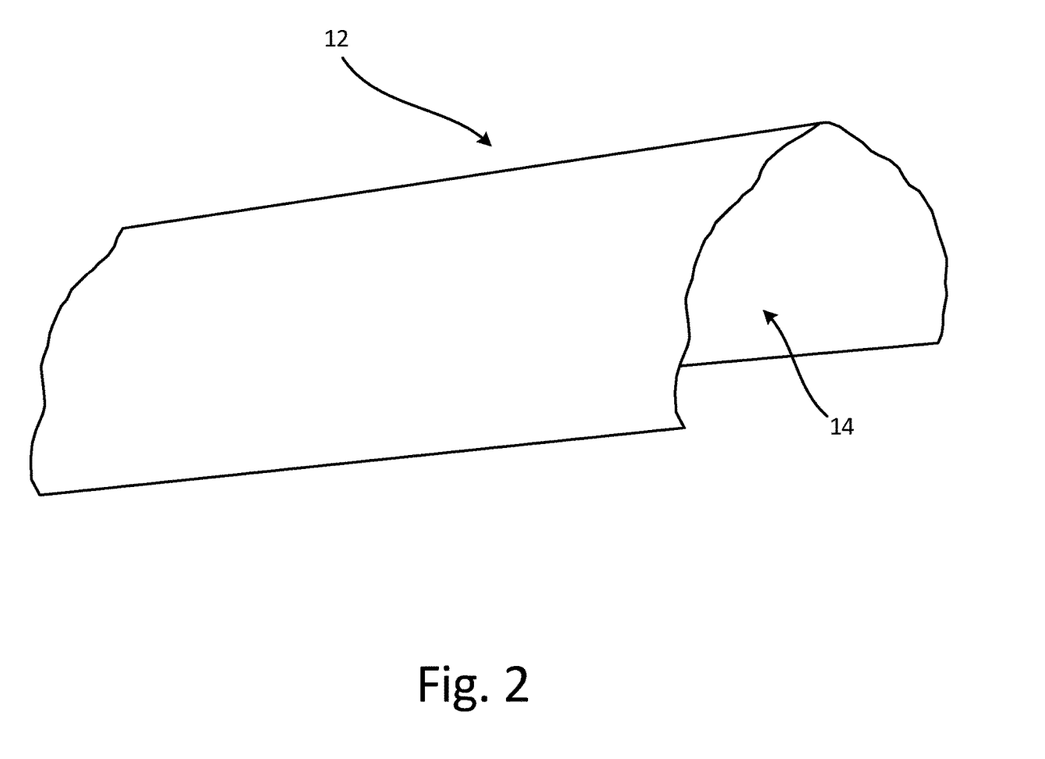
FIG. 2 is a perspective view of heating assembly 10A shown in FIG. 1A.

FIG. 2 shows a perspective view of heating assembly 10A, also pictured as a schematic diagram in FIG. 1A. Assembly 10A is shown as a bendable sheet, which can be formed to an aircraft element (not pictured). Heating assembly 10A is a thin sheet with breeze side 12, facing the external surface subject to icing, and bond side 14, which will be bonded to an aircraft element.

Figure 3:
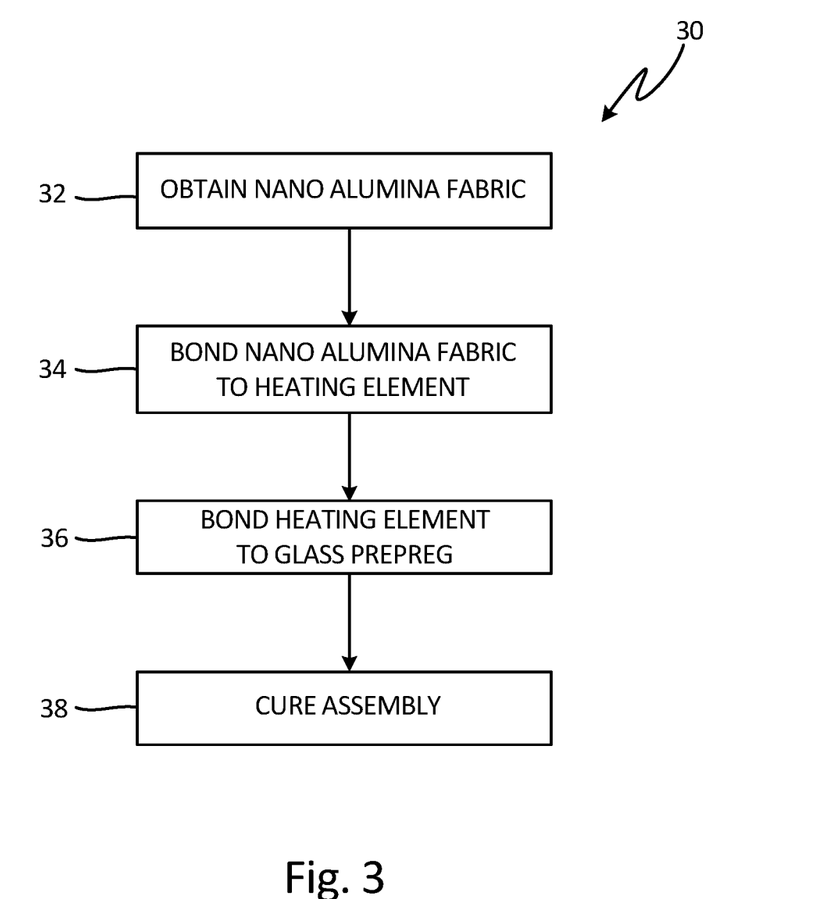
FIG. 3 is a flowchart depicting a method of making a thermally conductive, electrically insulated protected heater assembly.

FIG. 3 is a flowchart depicting method 30 of preparing a thermally conductive, electrically insulated protected heater assembly. Method 30 beings with steps 34 and 36, where the layers of the assembly are adhered together. The layers include a nano alumina pre-preg fabric, an electric heater, a pre-preg glass fabric, and at least one adhesive.

Nano alumina pre-preg fabric can be bought or fabricated. If it is fabricated, nano alumina can be grown on a glass fiber matrix. They are then impregnated with a polymer resin such as an epoxy or a phenolic polymer. The mixture is then cured, resulting in "fuzzy" alumina fabric. Commercially available nano alumina pre-preg fabric consists of a glass fiber "scaffold" on which nano alumina is woven.

The electric heater is typically a sheet heater, and can be a carbon-based or resistive type heater. The glass pre-preg fabric can be commercially obtained, or fabricated. The adhesive is typically a film adhesive which will be used between the layers of the assembly.

The nano alumina fabric is bonded to an electric heater with an adhesive in step 34. The Nano alumina fabric can serve as the external protection of the heating element, or can be layered with a second fabric, such as a metallic skin or carbon-based skin, to create a tough protection layer. The Nano alumina fabric protects the heating element from FOD.

In step 36, the heating element is bonded to a glass pre-preg layer opposite the Nano alumina pre-preg fabric. Finally, the assembly must be cured in step 38. The heating element "sandwich" between the Nano alumina fabric and the glass pre-preg can then be applied to an external surface of an aircraft.

The use of a Nano alumina fabric to protect an electrical heater used for de-icing has several benefits. Generally, for de-icing purposes, electrical heaters should be placed closer to the outside of an aircraft, so heating the surface takes less power. However, the closer a heater is to an external surface, the more likely it will be harmed by foreign object damage, including birds, hail and other surface damage. Thus, the best de-icing heaters are both close to the surface and very protected from FOD.

The Nano alumina fabric is uniquely good at protecting de-icing heaters because it is both thermally conductive, allowing heat to pass through the Nano alumina fabric, and electrically insulating, preventing the heaters from being shocked. Nano alumina fabric is also very strong and capable of mitigating FOD. Additionally, Nano alumina fabric is environmentally safe. Thus, when nano alumina fabric is attached to an electric heater on an aircraft for de-icing, the heater is a low-power heater close to the surface, with an FOD-withstanding heating structure.

Discussion of Possible Embodiments

The following are non-exclusive descriptions of possible embodiments of the present invention.

A heating assembly includes a nano alumina fabric; a first adhesive; a heating element, wherein the nano alumina fabric is attached to the heating element by the first adhesive; a second adhesive; and a glass pre-preg fabric, wherein the glass pre-preg fabric is attached to the heating element by the second adhesive on a side of the heating element opposite the nano alumina fabric.

The assembly of the preceding paragraph can optionally include, additionally and/or alternatively, any one or more of the following features, configurations and/or additional components:

The assembly includes a skin, wherein the skin is attached to the nano alumina fabric by a third adhesive.

The skin is comprised of a metal, an alloy, or a combination thereof.

The skin is comprised of a carbon pre-preg fabric.

The skin is comprised of a carbon nanotube pre-preg fabric.

The skin is comprised of a carbon nanotube filled film.

The assembly includes an aircraft element, the aircraft element connected to the glass pre-preg fabric with a fourth adhesive.

The assembly includes external electronics, wherein the external electronics are electrically connected to the heating element.

The heating element is a nano-carbon heater.

The heating element is a resistive heating element.

The nano alumina fabric is impregnated with a polymer resin chosen from the group consisting of an epoxy, a phenolic polymer, or bismaleimide.

A method for making a heating assembly includes obtaining a nano alumina fabric, wherein the nano alumina fabric comprises a glass fiber matrix and aluminum oxide fibers; bonding the nano alumina fabric to a heating element with a first adhesive; bonding the heating element to a glass pre-preg fabric with a second adhesive; and curing the assembly.

The method includes adhering a skin layer to the nano alumina fabric with a third adhesive.

The method includes connecting the heating element to external electronics through one or more wires.

The method includes attaching an aircraft element to the heater with a third adhesive.

The skin is comprised at least one of a metal or an alloy.

The skin is comprised of a carbon pre-preg fabric.

The method includes attaching a second skin to the nano first skin with a film adhesive.

The method includes installing the heating assembly directly under an external surface of an aircraft element.

The method includes attaching a second pre-preg fabric to the glass pre-preg fabric with an adhesive.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A heating assembly comprising:
    a nano alumina fabric that comprises:
        nano alumina fibers sized in nanometer dimensions grown or woven on glass fibers of a glass fiber matrix or scaffold, and
        a polymer resin selected from the group consisting of an epoxy, a phenolic polymer, a bismaleimide, and combinations thereof;
    a first adhesive;
    a heating element, wherein the nano alumina fabric is attached to the heating element by the first adhesive;
    a second adhesive; and
    a glass pre-preg fabric, wherein the glass pre-preg fabric is attached to the heating element by the second adhesive on a side of the heating element opposite the nano alumina fabric.

2. The assembly of claim 1 and further comprising a skin, wherein the skin is attached to the nano alumina fabric by a third adhesive.

3. The assembly of claim 2, wherein the skin comprises a material selected from the group consisting of a metal, an alloy, and combinations thereof.

4. The assembly of claim 2, wherein the skin comprises a carbon pre-preg fabric.

5. The assembly of claim 2, wherein the skin comprises a carbon nanotube pre-preg fabric.

6. The assembly of claim 2, wherein the skin comprises a carbon nanotube filled film.

7. The assembly of claim 1, wherein the heating element is a nano-carbon heater.

8. The assembly of claim 1, wherein the heating element is a resistive heating element.

9. The assembly of claim 1, further comprising one or more additional layers.

10. The assembly of claim 9, wherein the one or more additional layers comprise pre-preg fabrics.

11. A method for making a heating assembly, the method comprising:
    bonding a nano alumina fabric to a heating element with a first adhesive;
    bonding the heating element to a glass pre-preg fabric with a second adhesive; and
    curing the assembly; wherein the nano alumina fabric comprises nano alumina fibers sized in nanometer dimensions, grown or woven on glass fibers of a glass fiber matrix or scaffold, and a polymer resin selected from the group consisting of an epoxy, a phenolic polymer, a bismaleimide, and combinations thereof.

12. The method of claim 11, further comprising adhering a skin layer to the nano alumina fabric with a third adhesive.

13. The method of claim 12, wherein the skin is comprised at least one of a metal or an alloy.

14. The method of claim 12, wherein the skin is comprised of a carbon pre-preg fabric.

15. The method of claim 12, further comprising attaching a second skin to the nano first skin with a film adhesive.

16. The method of claim 11, further comprising attaching a second pre-preg fabric to the glass pre-preg fabric with an adhesive.

17. The method of claim 11, wherein curing the assembly including at more than one curing step.

* * * * *